United States Patent Office 3,493,355
Patented Feb. 3, 1970

3,493,355
METHOD OF PRODUCING A SEMICRYSTALLINE CERAMIC ARTICLE WITH A GLASSY BOROSILICATE SURFACE LAYER
Jimmy C. C. Wu, Toledo, Ohio, assignor to Owens-Illinois, Inc., a corporation of Ohio
No Drawing. Filed July 28, 1966, Ser. No. 596,025
Int. Cl. C03c 3/08
U.S. Cl. 65—30                    4 Claims

ABSTRACT OF THE DISCLOSURE

A silica containing semicrystalline ceramic body having an average coefficient of thermal expansion of less than $25 \times 10^{-7}/°$ C. over the range of 0 to 300° C. is provided with an integral glassy borosilicate surface layer 0.5 to 25 microns in thickness by contacting the surface of the semicrystalline ceramic body with vaporous boric oxide.

---

The present invention relates to improved, shaped glass ceramic materials and more particularly, to certain techniques and methods, the employment of which, or the exposure of the shaped glass or glass ceramic thereto, yields the desired improvements on the surface of the glass ceramic fully described hereinafter.

Glass ceramics are frequently referred to in the art as semicrystalline ceramic bodies and are composed of a crystalline phase dispersed in glassy phase or matrix; the former giving an opalescent to opaque white coloration to the bodies while also increasing the internal strength of the bodies. This feature is particularly evident in the bodies which exhibit extremely high resistance to thermal shock coupled with high temperature strength. These latter properties, together with the inherent ability of these glass ceramics to be formed by conventional glass forming apparatus and techniques, make them ideally suited for use in producing a number of useful products where such properties are desirable for example, as cookware, as space casings and components, as laboratory ware and the like. Cookware possessing the ability to be subjected to rapid temperature changes without cracking or breaking is in demand by housewives. In this regard, the thermal properties of the glass ceramics are superior to the known low-expansion transparent borosilicate type glasses sold and marketed for such uses as laboratory glassware. Thus, cookware formed of these glass ceramics can be taken from a hot stove and placed directly into the refrigerator or the freezing compartment thereof without any damage to the cookware. Conversely, food stored in the refrigerator in cookware formed of glass ceramic can be placed in contact with a hot stove, or in an oven, and cooked therein, again without any detrimental effects to the ware.

Further details on the compositional nature of these glass ceramics, as well as the techniques for producing them into their final form, will be described in detail in the body of the specification. Suffice it to say, by way of introduction, that these materials are formed of conventional inorganic glass forming oxides in a fairly wide range of proportions. There is, however, incorporated in the formulation one or more, preferably several, so-called nucleating agents which serve as sites for crystal growth. The glasses can be formed in conventional glass forming equipment, both manual and automatic, and, after forming, they are subjected to particular heat treatments which will vary depending upon the compositional formulation of the glass. As is known in the art, such glasses undergo nucleation and subsequent crystallization to form a ceramic body comprising a multiplicity of crystals dispersed throughout a glassy matrix. It is this crystalline network which lends the strength to the resulting ceramic, particularly in the heat or thermal shock properties, as noted above and hereinafter.

While shaped glass ceramic bodies are desirable by reason of the properties noted, there are several shortcomings which, up to the present time, have not been solved satisfactorily. One involves the inherent susceptibility to staining. It has been found that repeated use and contact with food results in a gradual darkening of the glass ceramic surface in contact with the food. This has been found to be particularly true in the case of coffee.

Another shortcoming of many known glass ceramics is that they are frequently found to possess a surface blemish in the nature of a visible curvilinear striation that tends to lend a dull, lusterless surface finish to the ultimate body formed of glass ceramic. The precise nature of this surface defect is not known, but it is unsightly, detracts from the appearance, and is believed to represent zones or sites for ready penetration by foods to cause staining, by alkali and the like.

It is accordingly, a general object of the present invention to provide a glass ceramic which does not possess the shortcomings enumerated hereinabove.

It is a particular object of the present invention to provide an improved glass ceramic body possessing considerably higher gloss than glass ceramics heretofore known.

It is also an object of the present invention to provide a glass ceramic article having improved gloss retaining properties while at the same time minimizing surface flaws and defects.

It is a primary object of the present invention to provide a unique method of treatment which improves the glass ceramics in the manner noted in the previous objects.

It is a particular object of the present invention to provide a method for improving the surface properties of glass ceramics, which method is readily incorporated into conventional glass ceramic manufacturing operations.

It is still another object of the present invention to provide a method which is versatile in that it may be practiced in one of several forms in order to meet the particular glass manufacturing process being employed.

It is still another object of the present invention to provide a method of treatment which, in addition to improving certain surface properties, improves or facilitates the high temperature staining of the ultimate glass ceramic body with color stain and/or decoration, whether effected before or after the treatment of the present invention.

It is a further object of the present invention to provide a method of treating glass ceramics whereby the final body bears a surface layer of definite glassy character or glassy composition; that is, it is non-crystalline as compared to the main body of the glass ceramic, but which glassy layer is integrally joined to the semicrystalline ceramic body substrate.

It attaining the objects of this invention one feature resides in contacting the surface of the glass article with an atmosphere rich in $B_2O_3$ during the crystallization heat treatment of the article to form the glass ceramic.

Another feature resides in contacting the surface of a semicrystalline ceramic body with an atmosphere rich in $B_2O_3$ at an elevated temperature for a time sufficient to form a hard glossy, vitreous, borosilicate layer thereon.

Other objects, features and advantages of the invention will become apparent from a reading of the following description thereof.

In its broader aspects, the present invention includes the application to the article, either before, during or after nucleation and ultimate crystallization thereof, of boric oxide and maintaining the article at a temperature sufficient to form a glassy layer on the surface of the final glass ceramic, which layer imparts a permanent and improved gloss to the surface and improved durability.

It is frequently found most efficacious to practice the present invention by exposing the formed glass body, during crystallization, to an atmosphere rich in vaporous $B_2O_3$. The glass body is maintained at a temperature for a time sufficient to produce a semicrystalline ceramic body by any well-known process of nucleation, development, and crystallization. The semicrystalline body formed by the aforesaid treatment will have a glassy surface layer, rich in $B_2O_3$ and exhibit desirable chemical and physical properties. The heat treatment of the thermally crystallizable glass causes, as is well known, in situ crystallization of a multitude of small crystals dispersed in random orientation throughout a glassy matrix remaining as a result of the thermal in situ crystallization, while the boric oxide contacting the surface of the body during the thermal crystallization causes a physical or chemical reaction with the surface of the body and thus forms a glassy borosilicate surface layer on the finished glass-ceramic body.

It will be observed that the glass ceramic body is possessed of a much higher gloss than can be achieved by known nucleation, development, and crystallization steps but in the absence of the $B_2O_3$ treatment. The product thus formed according to the invention is completely free of the aforesaid swirllike surface defects.

The surface defect in a swirl pattern is not understood, but it has the appearance that might be expected in the case of an incomplete distribution of the nucleating agent whereby the swirl pattern would represent a heavier concentration of the nucleating agent resulting in a more highly concentrated area of crystallization.

As will be seen from the following description of glass ceramics and specific examples of the present invention, the method of the invention is extremely versatile and can be practiced on a wide variety of glasses representing considerable variance in compositional analysis. Several methods of practicing the invention will be apparent to one skilled in the art. In addition to dipping the glass body into or applying thereto liquid boric oxide containing and yielding material, vaporous boric oxide can be applied to the body by either vaporizing boric oxide or oxidizing a boron compound to form an atmosphere of vaporous boric oxide. Additionally, the boric oxide application to the surface of the glass can be effected by asperating combustible fuel gas through a solution of alkyl borate, e.g., methylborate and thereafter burning the mixture in the presence of oxygen in a burner arrangement with the nozzle thereof aimed to impinge on the surface of the glass. In this fashion, the alkyl borate is converted to $B_2O_3$ and the $B_2O_3$ is deposited on the surface of the glass body before the crystallization takes place. The burner can be independently controlled to apply various thicknesses of the glassy layer onto selected areas of the formed body.

Thickness of the applied glassy layer is important. Too thin a layer achieves no noticeable increase in surface properties (i.e., improved gloss, gloss retention, etc.). At the other extreme, too thick a glassy layer results in a glass ceramic body which is not capable of thermal performance of even the conventional glass ceramic materials. If the glassy layer is too thick the product will crack when subjected to the thermal stresses to which the conventional glass ceramics are immune. It has been found that the glassy layer should be of a thickness of from ½ to 25 microns, and preferably from 3 to 15 microns. The optimum thickness is from 5 to 10 microns.

Broadly speaking, the invention is applicable to silicate glass-ceramics having a lineal coefficient of thermal expansion of less than $25 \times 10^{-7}/°$ C. (0–300° C.). Such glass-ceramics wherein the predominant crystalline species are lithium containing crystalline phases comprised of beta-spodumene or beta-spodumene like crystals of beta-eucryptite or beta-eucryptite like crystals, or mixtures thereof, are particularly suitable for the purposes of the present invention. By predominent crystalline species it is meant that these lithium-containing crystalline phases are present in greater amount by volume than any other crystalline material present in the claimed ceramic product.

In this specification the terms beta-eucryptite crystals and beta-eucryptite like crystals have been used in an alternative sense. Thus, while beta-eucryptite is often thought of as the species crystal having one mole of lithia, one mole of alumina and 2 moles of silica, both terms are used in this application to designate crystalline species having the beta-eucryptite structure, as shown by X-ray diffraction, but the peaks can be shifted slightly depending upon whether there is a definite amount of silica present other than exactly 2 moles, either more or less silica than the 2 moles. Similarly, the terms beta-spodumene crystals and beta-spodumene like crystals are used alternatively and in a generic sense, specifying crystalline species that have the crystalline structure of beta-spodumene that contains 4 moles of silica to one of alumina and one of lithia, but with the peaks shifted somewhat when the crystalline structure contains more or less than 4 moles of silica. In the specification and claims, therefore, the terms beta-eucryptite and beta-spodumene are each used in this generic sense.

Such glass-ceramics are derived from lithium aluminosilicate glasses. In commercial practice, crystallizable glass compositions of the $Li_2O$—$Al_2O_3$—$SiO_2$ system have the components in the percentages shown in the following Table I, wherein the amounts of ingredients are expressed in weight percent of the total glass. These components make up at least 80 weight percent of the total glass or glass ceramic composition.

TABLE I

| Major Constituents | Broad Range | Preferred Range | Optimum Range |
|---|---|---|---|
| $SiO_2$ (percent) | 50–80 | 60–75 | 66–73 |
| $Al_2O_3$ (percent) | 10–35 | 14–25 | 15–20 |
| $Li_2O$ (percent) | 2–7 | 2–5 | 2.5–4 |

The above mentioned system usually contains a relatively small amount, usually 2–12% by weight, of material (called nucleating agents) that serves to initiate or nucleate the growth of the crystalline phase. Uusual nucleating agents employed are $TiO_2$, $ZrO_2$, and $SnO_2$ or combinations of these. In addition, the compositions of Table I, usually containing one or more nucleant can have modifying agents in the ranges indicated in Table II and preferably have at least one component listed in Table II in the amount indicated therein.

TABLE II

| Modifying Agents | Broad Range, percent | Preferred Range, percent |
|---|---|---|
| MgO | 0–15 | 0.1–7 |
| CaO | 0–10 | .05–5 |
| $P_2O_5$ | 0–5 | 0.1–3 |
| BaO | 0–10 | 0.1–4 |
| $SnO_2$ | 0–2 | .05–1 |
| NaF | 0–3 | .05–1 |
| $Na_2O$ | 0–2 | .05–1 |
| $K_2O$ | 0–3 | .05–1 |
| $CaF_2$ | 0–8 | .05–2 |
| LiF | 0–5 | .05–2 |
| $B_2O_3$ | 0–5 | .05–3 |
| KF | 0–3 | .05–1 |
| PbO | 0–5 | .05–2 |

The preceding description is included by way of illustration and should not be construed as limiting the present invention. It will become apparent to one skilled in the art that the present invention can be practiced on any vitreous system that is capable of being crystallized to a low expansion glass ceramic.

The critical factors involved in the production of a glass ceramic consisting essentially of a glassy phase and a crystalline phase, are:

(1) The selection of glassy systems of the proper composition that are capable of crystallization.

(2) The inclusion of the proper amount of nucleating agents to promote crystallization.

(3) The utilization of a heat treatment that ultimately results in the formation of a crystalline phase in solid solution in and dispersed throughout a glassy matrix.

The known heat treatments of the vitreous compositions to form glass ceramics include a nucleation phase at substantially the temperature of the annealing point (viscosity $10^{13}$ poises), a development phase at a temperature below the fiber softening point (preferably at a viscosity in the range of $10^8$ to $10^{12}$ poises), and a crystallization phase (at a temperature preferably 150–300° F. above the fiber softening point which viscosity is $10^{7.65}$ poises). In accordance with a preferred embodiment of the present invention, the glass ceramic after having the boric oxide coating applied by one of the techniques discussed above, is subjected to the above described heat treatment followed by a final heat treatment at a temperature of at least 1700° F. The upper temperature limit in this final heat treatment is not critical from the standpoint of the present invention. The upper temperature selection is governed by commercial consideration and it is understood that a temperature at which the semicrystalline ceramic body deforms would not be selected.

Although the crystallization process itself is not the subject of the instant invention, the following description is included in the interest of completeness of disclosure. The method of forming glass-ceramic material is well known in the art. The composition to be crystalized is heated to a temperature corresponding to a viscosity of about $10^{13}$ poises and maintained at said temperature long enough to permit the formation of submicroscopic crystals of the nucleating agent dispersed throughout the glassy matrix. This is commonly known as the nucleating period. The time required for this nucleation phase of the process varies according to the composition utilized. The nucleation period utilized for the composition hereinafter described in Example I was approximately ½ to 2 hours.

The glassy matrix containing the nucleating agent crystals is then heated to a temperature corresponding to a viscosity of approximately $10^8$ poises. This thermal condition is maintained for sufficient time to permit the base composition to partially crystallize and form a rigid, crystalline structure. This structure is predominantly formed from the base composition and not from the nucleating agents. The submicroscopic nuclei dispersed in the glassy matrix as a result of the nucleation phase, act as growth centers for the rigid framework formed during this second or development phase of the heating cycle. The development phase utilized for the composition hereinafter described in Example I was approximately 1–2 hours. The purpose of the development phase is to provide a rigid, skeletal, crystalline framework to support the remaining glassy matrix when the temperature is raised above the temperature of the glass fiber softening point to complete crystallization.

This semicrystalline glassy material that is formed by the heating technique utilized in the development phase is then heated to a temperature of 150° to 300° F. above the temperature corresponding to the viscosity of $10^{7.65}$ poises. This temperature is maintained until the desired degree of crystallinity is attained. For the composition hereinafter described in Example I, the final crystalization phase of the heat treating cycle was approximately 1–2 hours. In actual practice, it has been found that all three phases of said heating process can be accomplished on one lehr belt continuously advancing the article through successive temperature zones of nucleation, development and crystallization. In many compositions, it has been found that a formal "development phase" is not required since the time required to heat the article from the "nucleation" temperature to the "crystallization" temperature is sufficient.

The following examples illustrate the invention as applied to a typical crystallizable composition selected from the aforesaid system ($Li_2O$—$Al_2O_3$—$SiO_2$). These examples are included to demonstrate the features and advantages of the instant invention and should not be interpreted as limiting the invention either from a compositional or a procedural standpoint.

EXAMPLE I

Composition A (expressed in weight percent)

| | |
|---|---|
| $SiO_2$ | 68.5 |
| $Al_2O_3$ | 15.7 |
| $Li_2O$ | 2.7 |
| $MgO$ | 5.0 |
| $ZrO_2$ | 1.4 |
| $TiO_2$ | 1.8 |
| $BaO$ | 2.7 |
| $ZnO$ | 1.0 |
| $MnO$ | 0.1 |
| $As_2O_3$ | 0.25 |
| $F_2$ | 0.15 |
| $P_2O_5$ | 0.5 |

In accordance with the present invention, a glass skillet formed of Composition A was placed in a refractory "sagger," the inside surfaces of which had been coated with a melt of boric oxide ($B_2O_3$). The "sagger" supports the peripheral lip of the cylindrical wall as well as the plenar bottom, preventing any deformation or warping during the heat treatment. The refractory chamber, e.g., the "sagger," about the body formed of this glass effectively isolated the glass article from the atmosphere. The skillet was then placed in a muffle furnace at room temperature and the temperature within the furnace was increased to 1900° F. over a period of 3 hours. When a temperature of 1900° F. was reached, it was maintained for about 45 minutes. By gradually increasing the furnace temperature in this manner, the article was subjected to the aforementioned nucleation, development and crystallization stages.

The temperature of about 1500° F. to 1800° F. caused vaporization of $B_2O_3$ and deposition thereof on the skillet surface. Thereafter, the article was cooled gradually, whereupon examination of the skillet surface revealed an extremely high gloss.

A specimen cut from the bottom of the skillet was examined edgewise and it was determined that a definite glassy layer had formed which measured 6 microns in thickness. A similar skillet made from Composition A, but not subjected to the vapor treatment with $B_2O_3$, showed definite swirl-like surface defects in the form of curvilinear striations on the surface. The skillet having the glassy layer was immersed in refluxing 5% NaOH solution for 2½ hours. The highly glossy surface showed no noticeable attack. An identical specimen was subjected to 10% HCl solution for 2½ hours with no noticeable attack. The sample was subjected to a thermal shock test by quenching the glazed surface four times from a temperature of 700° F. to room temperature in water. Microscopic inspection of this sample at 30× magnification showed no noticeable cracks. The glassy layered surface effected by the $B_2O_3$ treatment was not scratched with conventional utensile steel. A similarly prepared sample was stained with a cobalt blue before heating. A very desirable permanent decoration resulted. The vitreous glaze that formed according to the process described above was analyzed and found to contain about 20% $B_2O_3$ by weight. The remaining 80% of the vitreous glaze consisted of $SiO_2$, $Al_2O_3$, $MgO$, $Li_2O$, $ZrO_2$, $TiO_2$, $BaO$ and $ZnO$.

EXAMPLE II

Small cup-shaped dishes were formed from glass of Composition A, of Example I, and were placed in a $B_2O_3$ coated refractory "sagger" as in Example I. Thereafter, the samples were heated for 1½ hours at 1420° F., thence for another 1½ hours at 1740° F. and finally for an additional 1½ hours at 1950° F. After cooling the samples, examination revealed that glass-ceramic articles having a surface layer of glassy character were formed. The dishes possessed a very high surface gloss, not subject to attack by alkali or staining by coffee. Similar samples were made with varying thicknesses of the glassy layer by varying the length of exposure to the vaporous $B_2O_3$. It was observed that the longer exposure periods resulted in thicker depositions of the $B_2O_3$ glaze. Specimens bearing the thicker vitreous glaze were subject to thermal stress; namely plunging the dish into cold water after heating to 700° F. Microscopic examination revealed the formation of fine check marks or "crazing." The samples with the thinner vitreous glaze showed no noticeable cracks when subjected to the same thermal shock tests. The above experiments indicate that the above invention may be practiced with the glaze thickness ranging from ½ to about 25 microns with the preferred range being about 3 to 15 microns. The optimum thickness was found to be about 5–10 microns.

EXAMPLE III

In accordance with another embodiment of the present invention, a lehr utilized to subject crystallizable glass materials to the nucleation and development temperature schedule was modified so that the annealing section of the lehr (where the temperature is maintained at about 1300° F.) contained a high concentration of vaporous $B_2O_3$. The vaporous $B_2O_3$ atmosphere was provided by locating a number of open containers of methylborate within the lehr. The draft in the lehr caused the $B_2O_3$ to enter the higher temperature areas. Skillets formed of glass Composition A of Example I, were passed through the lehr to provide the heat treatment normally utilized in the formation of partially crystallized glass ceramics. The skillets upon cooling revealed formation of a 6 micron thickness glassy layer. No surface defects were noted.

Formation of a glassy layer imparting improved surface properties can also be achieved as follows. Fuel gas is introduced into a vessel containing liquid methylborate and below the level of the methylborate. The bubbling of the fuel gas through methylborate causes the gas to become rich in the volatile methylborate. When this is subsequently directed through a flexible line to a jet nozzle and ignited, the flame can be impinged upon the surface of a formed glass or glass-ceramic article. A principal advantage of this flame jet technique is that it permits achievement of a localized deposition of the $B_2O_3$ glassy layer on the semicrystalline substrate. This flame jet technique may obviate the necessity of the heat treatment above about 1700° F., provided the concentration of boric oxide (from methylborate) and flame temperatures are balanced properly so that fusion results, but too great a thickness is avoided. This experiment demonstrates that the process is readily adapted to conventional heat treating processes and equipment used in the production of partially crystalline ceramics.

EXAMPLE IV

One inch diameter disks of Composition A from Example I were prepared by cutting the bottoms from experimental bowls formed by conventional glass-forming techniques, using a diamond core drill. The disk samples were washed in Alconox (trade name for a compounded alkyl aryl sulfonate cleaning agent for laboratory and hospital glassware) rinsed in distilled water, dried in acetone and placed in 284° F. oven for 15 minutes. Some of the disks were cut from bowls which had been exposed to the $B_2O_3$ atmosphere and which, upon examination, revealed a 6 micron thickness glassy layer, while others of the disks represented those cut from bowls which had not been subjected to the $B_2O_3$ atmosphere. The disks were examined in a Hunter D–16 gloss meter to determine the gloss reading before and after immersion in 1% NaOH for 4 hours at 194° F. The samples which bore the glassy layer provided by the $B_2O_3$ vapor treatment measured 65 in the glossometer before the 4-hour immersion in sodium hydroxide. After the 4-hour immersion, the gloss measured 57.3. Disks, on the other hand, which had been cut from bowls not exposed to the $B_2O_3$ treatment, and accordingly not possessing the glassy layer, measured 41.7 before the immersion and 3.8 after the 4-hour immersion. Another series of disks bearing the glassy layer measured an average 65.6 before immersion on the Hunter gloss meter and an average 62.3 after the 4-hour immersion. A further series of disks cut from bowls not exposed to the $B_2O_3$ vapor measured an average 45.0 on the Hunter gloss meter before immersion and an average of only 6.5 after immersion. Similar tests were conducted with other disks using commercial detergent solutions such as "Easy-Off," "Handy Andy" and also 10% HCl. In all cases, the gloss reading showed practically no decrease, after immersion, for the $B_2O_3$ treated glass ceramic, whereas the disk samples cut from bowls which did not bear the $B_2O_3$ glassy layer showed loss of gloss.

From the foregoing examples it will be apparent to one skilled in the art that an important feature of the invention resides in the deposition of $B_2O_3$ on the surface of the glass or glass-ceramic body at some phase of the heat treatment. The boron compound utilized as the source of $B_2O_3$ may be either organic or inorganic in nature. The organic boron compounds may be either aliphatic or aromatic. Suitable aliphatic boron compounds include trimethyl borate, triethyl borate, tripropyl borate, tributyl and other compounds of the formula B—$(OR)_3$ where R is either a branched or straight chain alkyl, borines of the formula $B(R)_3$ where R is a branched or straight chain alkyl may also be used. Specific examples are trimethyl borine $B(CH_3)_3$, triethyl borine $B(C_2H_5)_3$, tripropyl borine $B(C_3H_7)_3$ and the like, preferably having from 1–10 carbon atoms. Boron hydrides of the formulae $B_nH_{n+4}$ and $B_nH_{n+6}$ may also be used. These compounds are generally known as boranes in industrial practice, examples of which are $B_2H_6$, $B_4H_{10}$, $B_5H_9$, $B_5H_{11}$, $B_6H_{10}$ and $B_2H_{14}$. Aromatic boron compounds such as the benzyl, phenyl and naphthyl borates are also suitable.

Inorganic boron containing compounds include boron nitride, ammonium borate, sodium borate, calcium borate, sodium tetraborate decahydrate (borax), and the like.

It is generally preferred to introduce the organic boron compounds at that phase of the heat treatment wherein the temperature is high enough to convert the compound to $B_2O_3$ but prior to the time when the temperature is raised to effectuate the final crystallization. Temperatures of 700° to 1300° are usually satisfactory for oxidation to $B_2O_3$. When inorganic boron compounds are used, the $B_2O_3$ glaze can be formed by vaporization of a solid as demonstrated in Example I. The important factor is the deposition of $B_2O_3$ on the surface of the glass or glass-ceramic body and the ultimate heating at a temperature below the deformation temperature for a time sufficient to develop a hard, glossy, vitreous glaze.

As indicated hereinbefore, the vaporous $B_2O_3$ may be applied by means of (1) a batch type refractory "sagger" arrangement wherein the $B_2O_3$ as a melt is applied to the refractory or (2) a flame impingement technique where the $B_2O_3$ as methyl borate is picked up by bubbling fuel gas therethrough before ignition, or (3) provisions for a $B_2O_3$ vapor rich atmosphere in an annealing lehr. It appears to make little difference whether the $B_2O_3$ treatment is accomplished before, during or after the crystallization heat treatment so long as, at some time after the deposition of the $B_2O_3$, the $B_2O_3$ bearing glass ceramic is exposed to a temperature in the range of from about 1700° F. to just below the deformation temperature, for a short period of time, up to 5 hours, followed by gradual cooling to room temperature.

The heat treatment of the vapor application of $B_2O_3$ at a temperature of from 1700° F. to just below the deformation temperature of the glass requires a time of about 30 minutes at the high end of the temperature range while about 50 minutes is sufficient at temperatures of about 1900° F. A heat treatment involving less time than the 30 minutes can result in a layer which is not possessed of desirable gloss. Furthermore, the small measure of gloss imparted will be extremely short lived. A long period of heat treatment, e.g., longer than 50 minutes, will not adversely affect the $B_2O_3$ glazing, except that care should be exercised to ensure that the glazing layer is not excessively thick.

It has been determined that the improvement in surface properties of glass ceramics achieved by the treatment with vaporous $B_2O_3$ in accordance with this invention can be increased if minor amounts of tin oxide ($SnO_2$) are included in the $B_2O_3$ source being vaporized for treatment of the glass ceramic surface. The exact nature of this increase is not known, but appears to be unique as attempts at increasing the surface effect with titanium oxide ($TiO_2$) and zirconium oxide ($ZrO_2$) additions to the $B_2O_3$ source were unsuccessful. The vaporous $B_2O_3$ treatment of the glass ceramics in no way hinders the application of decorations either in the form of cobalt color stain or applied glass enamel color. Either can be applied before or after the heat treatment of the $B_2O_3$.

The exact phenomenon occurring in the $B_2O_3$ vapor treatment of the glass ceramic is not known nor is the exact composition of this glassy layer. Certainly all observations and tests establish that the glassy layer is integrally and permanently or fusibly attached to the glass ceramic substrate. By a glassy layer is meant one that is relatively free of nucleation or crystallization. This shows up rather clearly in microscopic examination of cut edges. It is suspected, however, that the $B_2O_3$, whether its source be inorganic or organic, undergoes a fusion solubilization with a certain amount of the surface semicrystalline ceramic forming a mutual solution of borosilicate, aluminum silicate and whatever other alkali or alkaline earth silicate is present. It is surprising that this complex glassy silicate, whatever its formulation or nature, adheres strongly to the crystalline substance, regardless of whether the layer is applied before or after crystallization so long as the thickness is maintained between ½ and 25 microns, preferably 3 to 15 microns. With the glassy layer held within these values by proper control of the treatment, no cracking of the glassy $B_2O_3$ layer is observed even under severe conditions of thermal shock.

I claim:

1. In the process of forming a semicrystalline ceramic body having an average coefficient of thermal expansion of less than $25 \times 10^{-7}$/° C. over the range of 0 to 300° C. by thermally in situ crystallizing a preformed silica containing thermally crystallizable glass body, the improvement comprising the step of contacting said body with boric oxide at a temperature sufficient to assure surface contact with vaporous boric oxide and formation of a glassy borosilicate surface layer on said semicrystalline ceramic body, said borosilicate surface layer having a thickness of from 0.5 to 25 microns.

2. The process as defined in claim 1 wherein said boric oxide is contacted with said body by heating a decomposable boron containing compound in the presence of oxygen to form boric oxide and depositing said boric oxide on the surface of said body.

3. The process as defined in claim 1 wherein said body is contacted with vaporous boric oxide while said body is thermally in situ crystallized to a semicrystalline ceramic body.

4. The process as defined in claim 1 wherein said body is heated at a temperature of from 1700° F. to below the deformation temperature of said body, after said body is contacted with boric oxide.

References Cited

UNITED STATES PATENTS

| 3,418,156 | 12/1968 | Medert et al. | 117—124 |
| 3,310,423 | 3/1967 | Ingham | 65—3 |
| 3,313,644 | 4/1967 | Morrissey | 65—33 |
| 3,380,818 | 4/1968 | Smith | 65—33 |

S. LEON BASHORE, Primary Examiner

E. R. FREEDMAN, Assistant Examiner

U.S. Cl. X.R.

65—33, 60; 106—54; 117—124